May 18, 1937.  R. C. KENYON  2,081,054
POWER STEERING SYSTEM
Filed Dec. 1, 1936    2 Sheets-Sheet 1
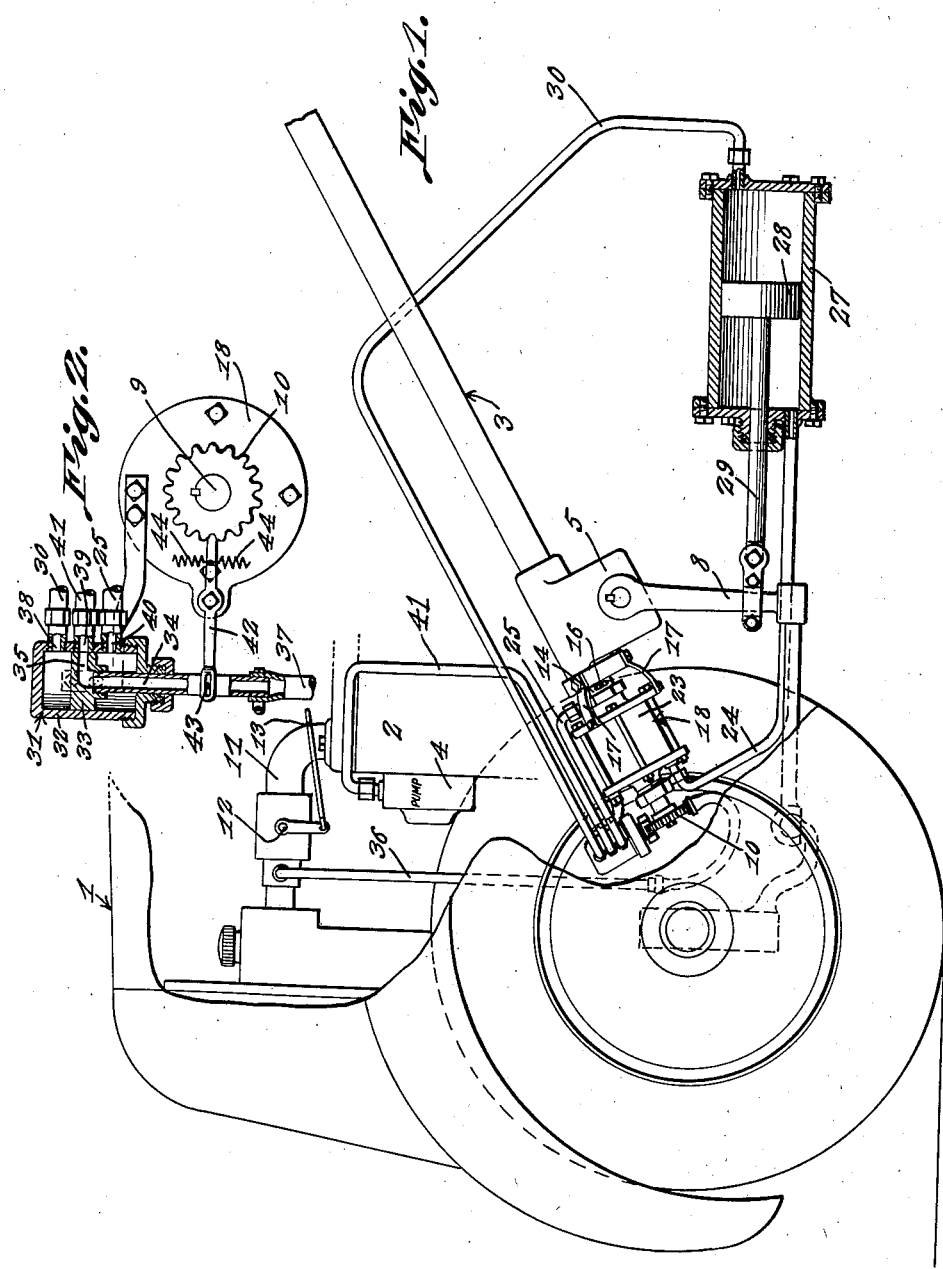
Roger C. Kenyon, INVENTOR
BY Victor J. Evans & Co.
ATTORNEYS May 18, 1937.  R. C. KENYON  2,081,054
POWER STEERING SYSTEM
Filed Dec. 1, 1936  2 Sheets-Sheet 2
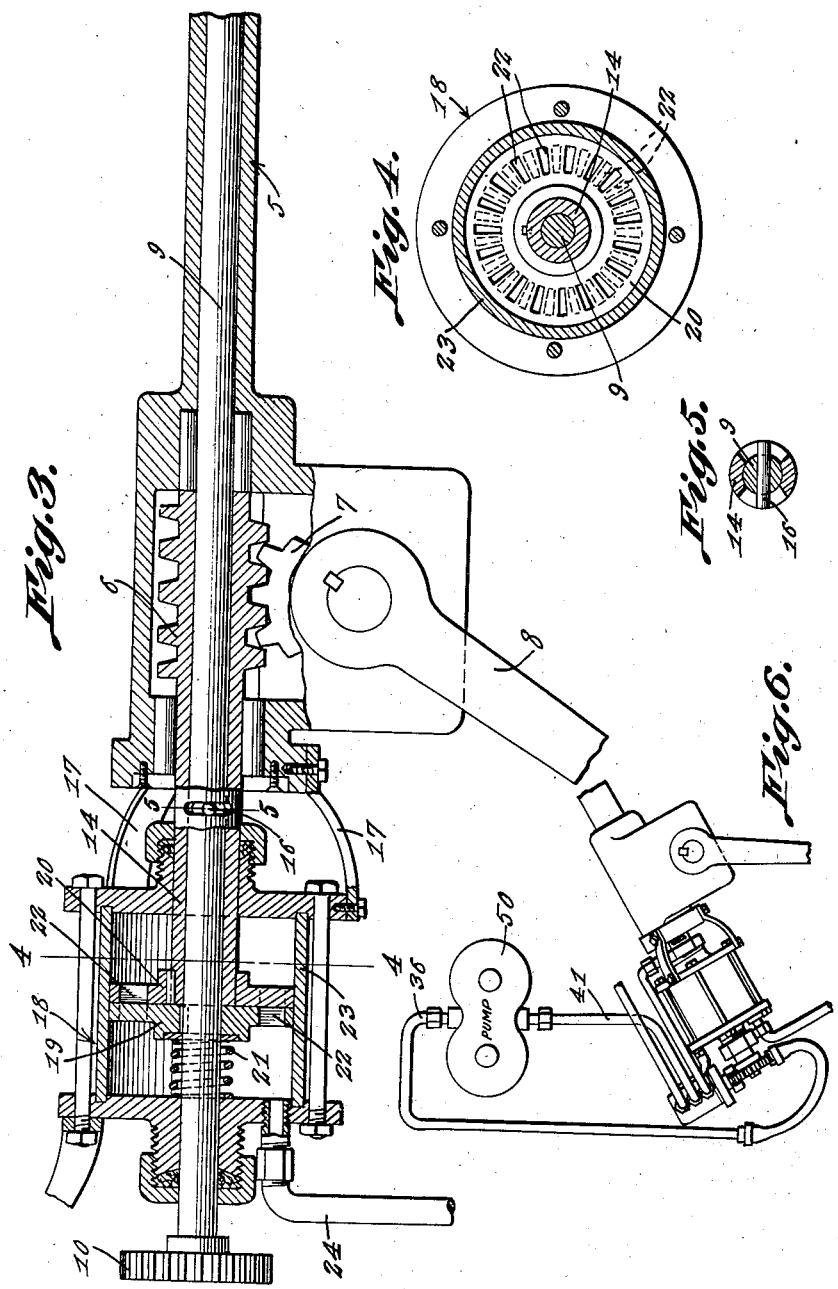
Roger C. Kenyon, INVENTOR
BY Victor J. Evans & Co.
ATTORNEYS Patented May 18, 1937

2,081,054

UNITED STATES PATENT OFFICE 2,081,054

POWER STEERING SYSTEM

Roger C. Kenyon, Le Grand, Calif.

Application December 1, 1936, Serial No. 113,686

2 Claims. (Cl. 180—79.2)

This invention relates to a power steering mechanism or booster for motor vehicles, and has for the primary object the provision of a hydraulic device of the above stated character which is manually controlled in a manner similar to the operation of a mechanical steering mechanism minus the manual force necessary to operate the latter and which provides a positive and safe steering of the vehicle and which will permit steering of the vehicle manually through the mechanical steering mechanism should the hydraulic device fail on account of a defect or some other cause.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary side elevation, partly in section, showing a hydraulic steering device adapted to a motor vehicle and connected with a mechanical steering device of said vehicle.

Figure 2 is a fragmentary sectional view illustrating a combined reversing and bypass valve.

Figure 3 is a fragmentary vertical sectional view illustrating a part of the hydraulic device and a part of a mechanical steering device.

Figure 4 is a transverse sectional view taken on the line 4—4 of Figure 3.

Figure 5 is a detail sectional view taken on the line 5—5 of Figure 3.

Figure 6 is a fragmentary side elevation illustrating a modified form of my invention.

Referring in detail to the drawings, the numeral 1 indicates a fragmentary portion of a motor vehicle, 2 the engine thereof and 3 a mechanical steering mechanism. The engine 2 includes a pump 4 for circulating cooling liquid through the cooling system of the engine. The steering mechanism 3 is of a conventional construction except for some minor detail or rearrangement of parts and includes the usual housing 5 rotatably supporting a worm 6 which meshes with a worm gear 7 secured to a steering arm 8. The steering column is indicated by the character 9 and extends through the worm and outwardly of the housing 5 and has secured to one end a gear 10 and to its opposite end a conventional type of steering wheel (not shown). The steering arm 8 is connected to the front or steering wheel of the motor vehicle in the usual manner. The cooling system of the engine 2 includes the return pipe 11 which extends from the jacket of the engine to the top of the radiator of the cooling system. The pipe 11 has therein a manually controlled valve 12. The valve 12 has an operating means 13 which extends to the instrument board of the motor vehicle. The parts heretofore described are found in motor vehicle construction now in use except the extending of the steering column 9 beyond the housing 5 and the gear 10. The steering column 9 is extended beyond the housing 5 for the purpose of adapting my invention to the steering mechanism and permitting gear 10 which forms a part of the present invention to be secured to the steering column. The worm 6 is slightly altered in order to adapt the present invention thereto by providing on the worm a sleeve 14 which projects out of the housing 5 and has a pin and slot connection with the steering column 9, as shown at 16, so that the worm is connected to the steering column but may have a limited turning movement relative thereto. The pin and slot connection between the worm or its sleeve 14 and the column 9 will permit steering of the vehicle in a conventional manner. This is provided in case my invention should fail to operate from some cause.

A bracket 17 connects to the housing 5 a steering valve mechanism 18 and through which extends the steering column 9 and also into which extends the sleeve 14 of the worm 6. Valve plates 19 and 20 are located in the valve mechanism 18 and the valve plate 19 is secured to the steering column 9 while the valve plate 20 is secured to the sleeve 14 of the worm 6. A spring 21 acts on the valve plate 19 to maintain the latter in frictional engagement with the valve plate 20. The valve plates 19 and 20 have a series of openings or ports 22 which are capable of aligning and moving out of registration with each other by the different relative movements of the plates and which will be hereinafter described. The valve mechanism 18 includes a suitable housing 23 in which the valve plates operate and a pipe 24 is connected to one end of the housing and a pipe 25 is connected to the opposite end of the housing. The valve plates, when their ports are out of registration, act to prevent flow of fluid pressure through the housing 23.

A power cylinder 27 is suitably mounted on the motor vehicle and has therein a piston 28 provided with a stem 29 which is suitably secured to the steering arm 8. The pipe 24 is connected to one end of the power cylinder while a pipe 30 is connected to the opposite end of the power cylinder.

A combined reversing and bypass valve 31 is supported by the housing 23 of the valve mechanism 18 and includes a valve housing 32 in which is slidably mounted a valve element 33 in the form of a piston having a hollow stem 34 which extends outwardly of the housing 32. The piston 33 has a port 35 opening outwardly through one side of the piston and is in communication with the hollow stem 34. The hollow stem 34 is connected to a pipe 36 by a flexible tube 37. The pipe 36 is connected to the pipe 11 of the cooling system of the engine 2. The valve housing 32 has ports 38, 39 and 40 so grouped that the port 35 of the valve element 33 may be made to register with any one of said ports 38, 39 and 40. The port 38 has the pipe 30 connected thereto. The port 39 has a pipe 41 connected thereto and said pipe is connected to the pump 4. The port 40 has the pipe 25 of the valve mechanism 18 connected thereto.

A lever 42 has one end thereof connected to the hollow stem 34 of the valve element 33 by a pin and slot connection 43. The lever 42 is pivoted on the valve housing 23 with one end thereof in engagement with teeth of the gear 10. Springs 44 act on the lever 42 to normally maintain said lever in a position for positioning the valve element 33 so that the port 35 is in registration with the port 39. The position of the valve element 33 is varied by the rotation of the steering column 9 in opposite directions for the purpose of steering the motor vehicle. When the gear 10 rotates in one direction it shifts the position of the valve element from that shown in Figure 2 so that the port 35 registers with the port 38. A slight reverse rotation of the gear 10 returns the valve element to the position shown in Figure 2 and further rotation of the gear 10 in the last-named direction brings the port 35 of the valve element 33 in registration with the port 40.

During non-turning of the steering wheels of the motor vehicle the port 35 of the valve element 33 communicates with the port 39 so that the circulation of fluid of the pump 4 will be through the pipe 41, hollow stem 34 and through the pipe 36 back to the cooling system of the engine. When the steering column 9 is turned in one direction the gear 10 rocks the lever 42 on its pivot moving the valve element 33 so that the port 35 thereof registers with the port 38. The circulation of the fluid is then from the pump through the pipe 41, port 39, port 40, pipe 25 into the valve housing 23 and during said turning of the steering column 9 the valve plate 19 is caused to turn relative to the valve plate 20 moving the ports 22 in alignment. The fluid passes through the valve plates and through the pipe 24 to one end of the power cylinder acting on the piston 28 to move the steering arm 8 to turn the steering wheels in one direction. The fluid displaced in the power cylinder by the movement of the piston 28 passes through the pipe 30, port 38, passage 35, hollow stem 34 and pipe 36 to the cooling system of the engine. As soon as the arm 8 moves, the worm 6 is rotated causing rotation of the valve plate 20 to move the ports thereof out of alignment with the ports of the valve plate 19, stopping the flow of fluid through the valve 18 thereby locking the fluid in the power cylinder 27 so that the steering wheels of the motor vehicle are held against further turning. However, should the steering column 9 be manually turned farther in the same direction the valve plate 19 will turn therewith and maintain the ports 22 of the valve plates in registration to continue the steering of the front wheels of the vehicle in said direction. When the ports of the valve plates 19 and 20 move out of alignment the operator naturally, after the vehicle turns in the direction selected, gives a slight reverse rotation to the steering column bringing about return of the valve element 33 so that the port 35 thereof registers with the port 39 permitting the fluid from the pump to bypass back to the cooling system of the engine by way of the pipe 36. To turn the steering wheels of the vehicle in an opposite direction from that described, a reverse turn is made on the steering column to shift the position of the valve element 33 from that shown in Figure 2 until the port 35 registers with the port 40. Then the flow of fluid from the pump is through the port 39, port 38, pipe 30 to the other end of the power cylinder 27 acting on the piston 28 in a reverse direction, thereby bringing about reverse steering of the front wheels of the vehicle. In order that the worm 6 turn by the action of the steering arm 8 the pin and slot connection 16 is provided. The pin and slot connection also permits mechanical steering of the front wheels of the vehicle should the hydraulic device become inoperative. The drive then would be from the steering column 9 to the worm 6 by way of the pin and slot connection.

Instead of using the pump 4 of the engine employed for circulating the cooling fluid of the cooling system, a pump 50 driven in any suitable way by the engine 2 may be connected to the pipes 41 and 36, as shown in Figure 6. When the pump 50 is employed the operation of this device is the same as when the pump 4 is employed and any kind of fluid may be employed in the hydraulic device.

Having described the invention, I claim:

1. In combination with a steering mechanism of a motor vehicle including a steering arm and a worm connected thereto, and a manually actuated steering column, means connecting the steering column to the worm whereby either may have a limited rotation relative to the other, a power cylinder including a piston connected to the steering arm, a fluid system connected to the cylinder at opposite sides of the piston and including a power driven pump for forcing fluid through the system to act on either side of the piston, a combined reversing and bypass valve connected in the system between the pump and the cylinder for reversing the flow of fluid in said system to drive the piston in opposite directions, means between said valve and the steering column for actuation of said valve to bring about reverse flow of fluid or to bypass the fluid around said cylinder, and means operated by said worm and steering column and connected in said system for stopping the flow of fluid in the system to said cylinder after the movement of the piston by a manual turning of the steering column in a limited reverse direction.

2. In combination with a steering mechanism of a motor vehicle including a steering arm and a worm connected thereto and a manually actuated steering column, means connecting the steering column to the worm whereby either may have a limited rotation relative to the other, a power cylinder including a piston connected to the steering arm, a fluid system connected to the cylinder at opposite sides of the piston and including a power driven pump for forcing fluid through the system to act on either side of the piston, a combined reversing and bypass valve connected in the system between the pump and the cylinder for reversing the flow of fluid in said system to drive the piston in opposite directions, means between said valve and the steering column for actuation of said valve to bring about reverse flow of the fluid or to bypass the fluid around said cylinder, and a valve mechanism connected in the system and including a valve housing with the steering column extending therethrough and the worm extending therein and valve plates operating in said valve housing and having ports and secured respectively to the steering column and to the worm whereby the flow of fluid through said valve housing will be permitted as long as the steering column is turned manually and to automatically stop the flow of fluid through the valve housing when the steering column is manually stopped.

ROGER C. KENYON.